United States Patent [19]

Barnett et al.

[11] Patent Number: 4,627,987

[45] Date of Patent: Dec. 9, 1986

[54] EDIBLE MATERIAL CONTAINING META-HYDROXYBENZOIC OR SALTS

[75] Inventors: Ronald E. Barnett, Suffern; Ronald G. Yarger, Pearl River, both of N.Y.

[73] Assignee: General Foods Corporation, White Plains, N.Y.

[21] Appl. No.: 683,972

[22] Filed: Dec. 20, 1984

Related U.S. Application Data

[63] Continuation-in-part of Ser. No. 477,799, Mar. 22, 1983, abandoned, which is a continuation-in-part of Ser. No. 274,035, Jun. 15, 1981, abandoned.

[51] Int. Cl.$^4$ .............................................. A23L 1/236
[52] U.S. Cl. .................................. 426/548; 426/658; 424/49; 514/772; 514/777
[58] Field of Search .................. 426/548, 658; 424/49; 514/772, 777

[56] References Cited

U.S. PATENT DOCUMENTS 3,876,816  4/1975  Zaffaroni ............................ 426/548

OTHER PUBLICATIONS

Belitz et al., "Sweet & Bitter Compounds: Structure and Taste Relationship;" Food Taste Chemistry, ACS Series 115, ACS: Wash., D.C., pp. 93, 114–115 (1979).
Jacobs, The Chemistry and Technology of Food & Food Products, vol. I, 1951, Interscience Publishers: New York, p. 32.

*Primary Examiner*—Joseph Golian
*Attorney, Agent, or Firm*—Linn I. Grim; Thomas A. Marcoux; Daniel J. Donovan

[57] ABSTRACT

Edible material compositions comprising a sweetener and a sweetness modifying agent, namely m-hydroxybenzoic acid, and processess for modifying the sweetness perception and reducing the sweetness content of the edible material are disclosed.

16 Claims, 4 Drawing Figures

EDIBLE MATERIAL CONTAINING META-HYDROXYBENZOIC OR SALTS

CROSS REFERENCE TO RELATED APPLICATIONS

The present application is a continuation in part of U.S. patent application Ser. No. 477,799 filed Mar. 22, 1983, now abandoned, which is a continuation-in-part of U.S. patent application Ser. No. 274,035 filed June 15, 1981, now abandoned, both of which are incorporated herein by reference.

BACKGROUND OF THE INVENTION

This invention relates generally to sweetness modification and more particularly to low-caloric compounds, particularly well suited as sweetness modifiers for edibe material.

Sweetness is one of the primary taste cravings of both animals and humans. Thus, the utilization of sweetening agents in foods in order to satisfy this sensory desire is well established.

Naturally occurring carbohydrate sweeteners, such as sucrose, are still the most widely used sweetening agents. While these naturally occurring carbohydrates, i.e. sugars, generally fulfill the requirements of sweet taste, the abundant usage thereof does not occur without deleterious consequences, e.g. high caloric input. In fact, often times the level of these sweeteners required to satisfy taste in edible material is far higher than that level of sweetener which is desired for economic, dietetic or other functional considerations.

In an attempt to eliminate the disadvantages concomitant with natural sweeteners, considerable research and expense have been devoted to the production of artificial sweeteners, such as for example, saccharin, cyclamate, dihydrochalcone, aspartame, etc. While some of these artificial sweeteners satisfy the requirements of sweet taste without caloric input and have met with considerable commercial success, they are not, however, without their own inherent disadvantages. For example, many of these artificial sweeteners have the disadvantages of high cost of production, as well as delay in perception of the sweet taste, persistent lingering of the sweet taste, and very objectionable bitter, metallic after-taste when used in food products.

Since it is believed that many of the disadvantages of artificial sweeteners, particularly after-taste, are a function of the concentration of the sweetener, it has been previously suggested that these effects could be reduced or eliminated by combining artificial sweeteners, such as saccharin, with other ingredients or natural sugars, such as pectin, sorbitol, dextrose, maltose, etc. These combined products, however, have not been entirely satisfactory either. Some U.S. patents which disclose sweetener mixtures include, for example, U.S. Pat. Nos. 4,228,198, 4,158,068, 4,154,862, 3,717,477.

More particularly, U.S. Pat. No. 4,228,198 discloses a sweetening composition comprised of a protein sweetener, saccharin or cyclamate in combination with a sweetness modifier, namely arabinogalactan. The patentee states that the arabinogalactan enhances the overall sweetness of the composition and reduces or eliminates the after taste.

U.S. Pat. No. 4,158,068 discloses a sweetener mixture having an improved saccharose-like taste consisting of acetosulfame and at least one sweetener from the group of aspartyl peptide esters, the sulfamate sweeteners, the sulfimide sweeteners and dihydrochalcone sweeteners.

Mixtures of artificial sweeteners, such as saccharin and the like, and neodiosmin are disclosed, in U.S. Pat. No. 4,154,862, as having reduced bitterness and after taste, while U.S. Pat. No. 3,717,477 discloses that the sweetening potency and taste of sodium saccharin are improved by the addition of small amounts of optically active D-tryptophan.

Other references disclose certain organic compounds to be sweet. Belitz et al., Sweet and Bitter Compounds: Structure and Taste Relationship, *Food Taste Chemistry*, ACS Symposium Series 115, Edited by James C. Boudreau, pp 93, 114–115 (1979) disclose m-hydroxybenzoic acid to have a threshold sweetness concentration of 5–7 millimoles/liter. This reference does not disclose or suggest that this compound would be an excellent foodstuff sweetener.

Furthermore, it is well known that enormous quantities of sweeteners are utilized in beverages, particularly commercial soft drinks and dessert products, for example, gelatins. Since many of these beverages and desserts have an acidic pH, not only must the sweetener employed therein be acid stable, but it also must be effective under acid pH conditions. In the case of sweeteners such as sucrose and saccharin, it is known that sweetening potency is generally decreased in acidic systems. Thus, in these acidic products such as, for example, carbonated beverages, etc., it is necessary to utilize relatively large quantities of these sweeteners to achieve the desired level of sweetness. These large quantities of sweetener are often times far higher than the level of sweetener desired for economic, nutritional or other functional considerations.

In view of the aforementioned disadvantages associated with the use of known sweeteners, i.e., naturally occurring, artificial or combinations thereof, it becomes readily apparent that it would be highly desirable to provide a sweetness modifying agent which when added to foodstuffs can eliminate or greatly diminish the numerous disadvantages associated with prior art sweeteners.

SUMMARY OF THE INVENTION

Figure 1:
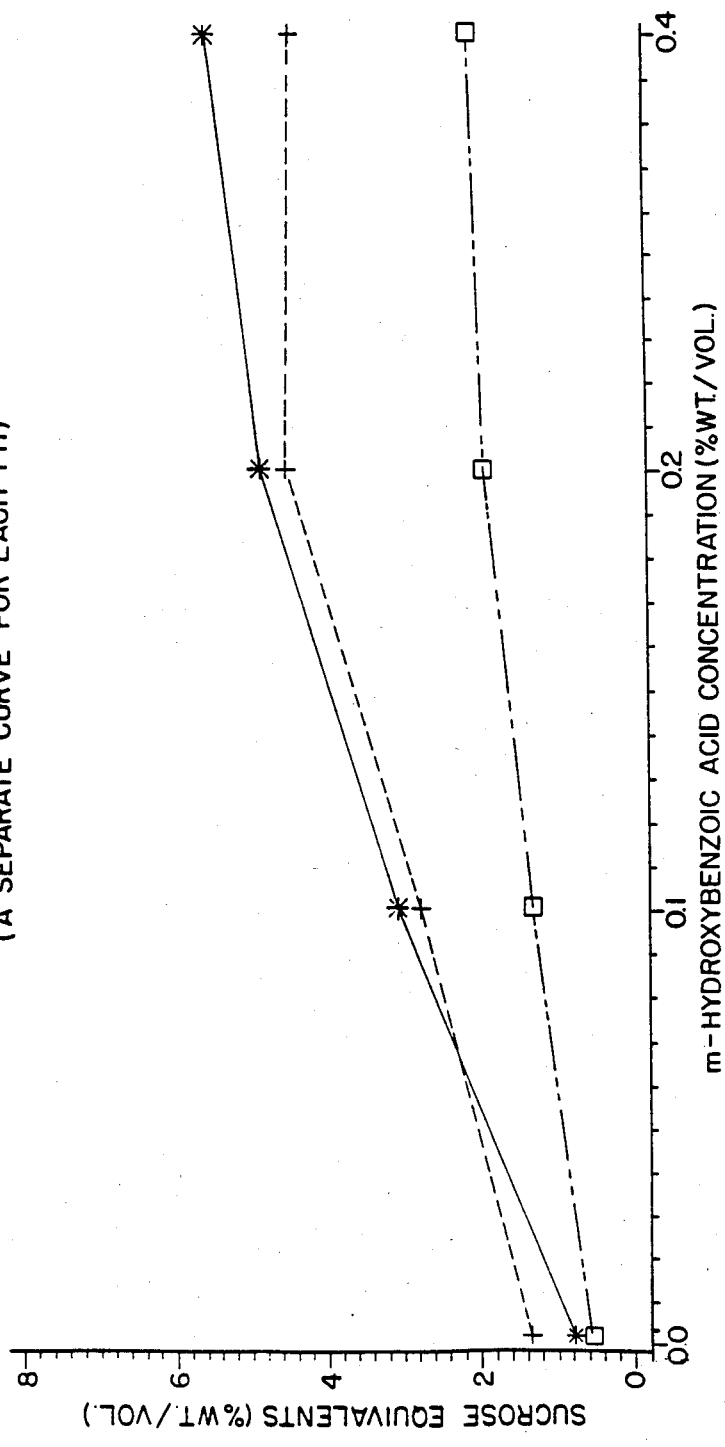
FIG. 1 is a graphical representation plotting the sweetness of m-hydroxybenzoic acid, in comparison to sucrose, as a function of concentration at varied levels of pH.

This invention pertains to an edible material, e.g., foodstuff, containing 0.01 to 0.4% weight m-hydroxybenzoic acid or non-toxic salts thereof and another food acceptable sweetener in sweetening amounts wherein the material has a pH of 2.0 to 5.5. It has been found that when m-hydroxybenzoic acid or salts thereof is used in edible material having a pH of 2.0 to 5.5 the sweetening effect from m-hydroxybenzoic acid is large at these pH's and thus the amount of other sweetener in the edible material can be greatly reduced.

DETAILED DESCRIPTION OF THE INVENTION

Thus, according to the present invention, it has been unexpectedly found that m-hydroxybenzoic acid and/or its food acceptable, non-toxic salts are effective sweetness modifying agents when used in combination with sweetening amounts of know natural and/or artificial food acceptable sweeteners, including for example, sucrose, fructose, corn syrup solids, dextrose, xylitol, sorbitol, mannitol, acesulfam, thaumatin, invert sugar, L sugars, saccharin, cyclamate, dihydrochalcones, meta-aminobenzoic acid, aspartame (L-aspartyl-L-phenylalanine methyl ester) and other dipeptides, glycerrhizin, stevioside, chorosucrose mixtures thereof and the like.

To achieve the desired result of the present invention, the utilization of only small quantities of m-hydroxybenzoic acid or its non-toxic salts are necessary. For example, depending on the particular edible material and sweetener, the m-hydroxybenzoic acid is generally added to the edible material in sweetness modifying amounts. These amounts are generally in the range of from about 0.01 to about 0.4 weight percent, based on the consumed weight of the edible material and preferably from about 0.05 to about 0.2 weight percent, based on the consumed weight of the edible material. It is to be understood that these afore-described amounts of m-hydroxybenzoic acid are based on the consumed weight of the edible material. Thus, the amounts employed in a product, for example, a dry beverage mix, prior to taking its consumed form by the addition of diluents or solvents such as water, will necessarily vary accordingly in the preconsumed form of the edible material. For example, in a pre-mix edible material comprising m-hydroxybenzoic acid or its salts, the m-hydroxybenzoic acid or its salts are present in an amount sufficient such that when a diluent is added to the premix edible material, the m-hydroxybenzoic acid or its salts are present in the diluted ingesta in an amount, for example, in the range of from about 0.1 to about 0.4% by weight of the diluted edible material. By diluent or solvent herein, solid or liquid additives such as water, carbonated water, milk, alcohol, eggs, food-acceptable sweeteners as defined in U.S. patent application Ser. No. 430,540 filed Sept. 30, 1982, now abandoned, and the like are contemplated. Pre-mix edible materials e.g. contemplated herein include, for example, dry mix and liquid foodstuffs and concentrates such as, for example, instant dry mix flavored beverages, instant dry mix gelatins and puddings, cake mixes, liquid beverages concentrates and the like. Furthermore, these afore-described sweetness modifying amounts are based on the free acid, namely m-hydroxybenzoic acid. Thus, in the event salts of this acid are utilized the amount of the salt employed in the foodstuff should be at least sufficient to provide the afore-described amounts of the acid.

For purposes of the present invention, the edible material referred herein comprises oral edible material i.e. edible material taken into the system through the oral cavity and includes typical foodstuffs, as well as pharmaceutical preparations, in which the m-hydroxybenzoic acid or salts thereof of the present invention may be used as a sweetness modifier. These are, for example, beverages, including soft drinks, carbonated beverages, ready-to-mix beverages and the like, infused foods (e.g. fruits or vegetables), sauces, condiments, salad dressings, juices, syrups, desserts, including puddings, gelatin and frozen desserts, like ice creams, sherbets and icings, confections, chewing gum, intermediate moisture foods (e.g. dog food, and cat food), animal food in general, including pet food; medicaments, toothpaste, mouthwashes and the like.

As indicated hereinbefore, the m-hydroxybenzoic acid is utiized in the edible material compositions having a pH from about 2 to 5.5. Unlike other sweeteners, such as sucrose and saccharin, it has been found that m-hydroxybenzoic acid is most effective as a sweetness modifier in edible material compositions having a pH from about 2.0 to 5.5.

Furthermore, as stated hereinbefore, the results of the present invention are provided when the sweetness modifying agent, namely m-hydroxybenzoic acid or its non-toxic salts, is employed in combination with a sweetner, such as those hereinbefore recited, in sweetening amounts. It is, of course, understood that when a mixture of sweeteners is utilized, it is not necessary that each sweetener be present in sweetening amounts provided that the sweetener mixture results in a sweetening amount.

Thus, for the purposes of this invention, best results are obtained when the m-hydroxybenzoic acid is employed in ingesta in combination with a sweetener, wherein the sweetener is present in amounts of above about 1 wt. % of sucrose equivalents. Preferably the sweetener content is in the range of from about 1 wt. % to about 25% sucrose equivalents and most preferably 3 wt. % to about 15 wt. % sucrose equivalents. Thus wherein the sweetner is, for example, saccharin, the amounts of saccharin, the amounts of saccharin which correspond to the afore-recited sucrose equivalents are above about 0.007, preferably from about 0.007 to about 0.08 wt. %, the most preferably from about 0.013 to about 0.05 wt. %. These values for aspartame are from above about 0.013, preferably about 0.013 to about 0.17, and most preferably about 0.03 to about 0.1. Sucrose equivalents for other know sweeteners are readily known or are easily determined. For example, the amount of a sweetener which is equivalent to 10 wt. % sucrose can be determined by having a panel taste a solution of sucrose. Obviously, sucrose equivalents for other than 10 wt. % sucrose are determined by matching the appropriate sucrose solutions.

For purposes herein the combination of sweetness modifier and sweetner should provide a total edible material sweetness of above about 3 wt. %, preferably from about 3 wt. % to about 40 wt. %, the most preferably from about 6 wt. % to about 16 wt. % sucrose equivalents.

Figure 2:
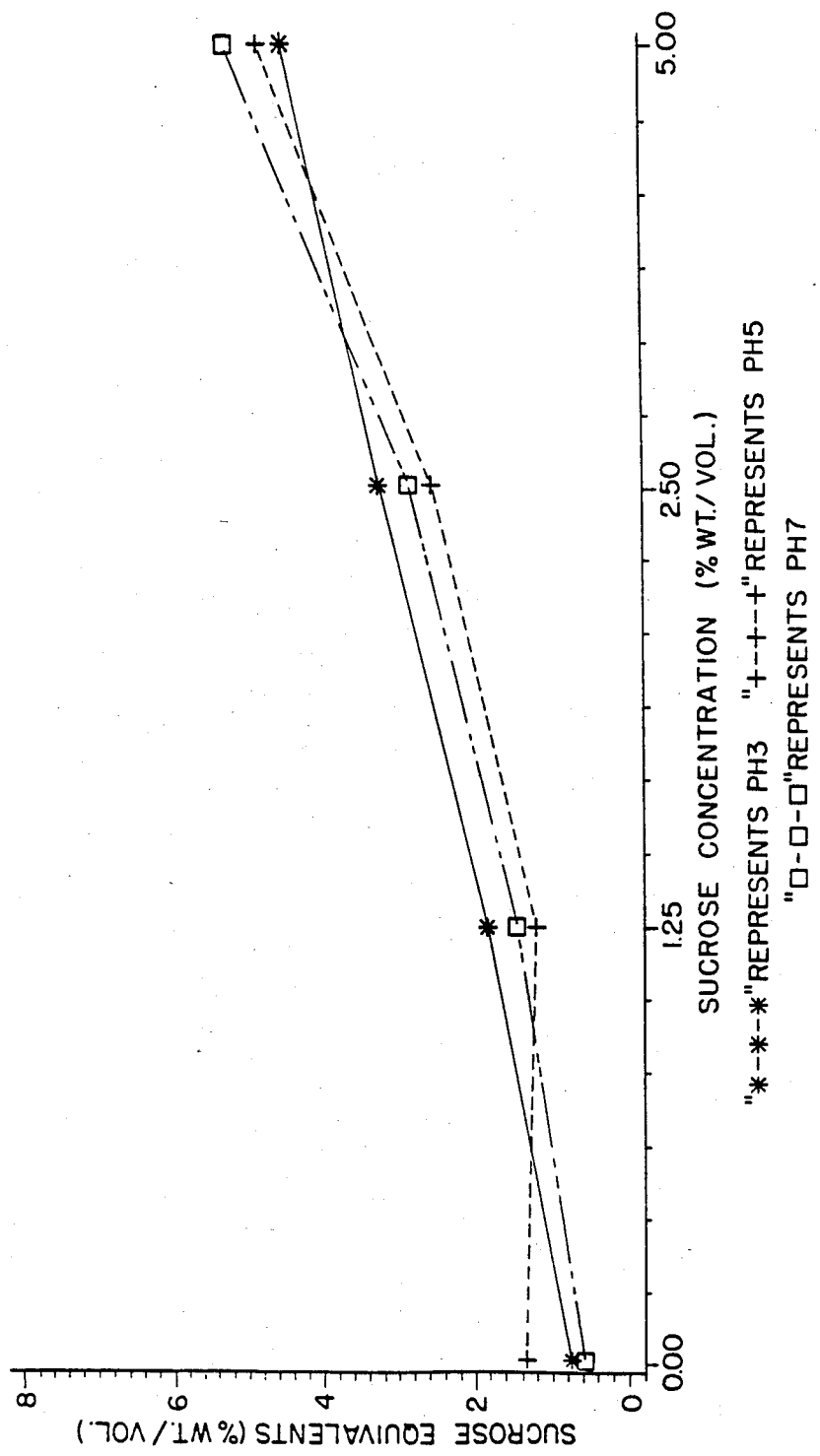
FIG. 2 is a graphical representation plotting the sweetness of sucrose as a function of concentration at varied levels of pH, in comparison to itself.
Figure 3:
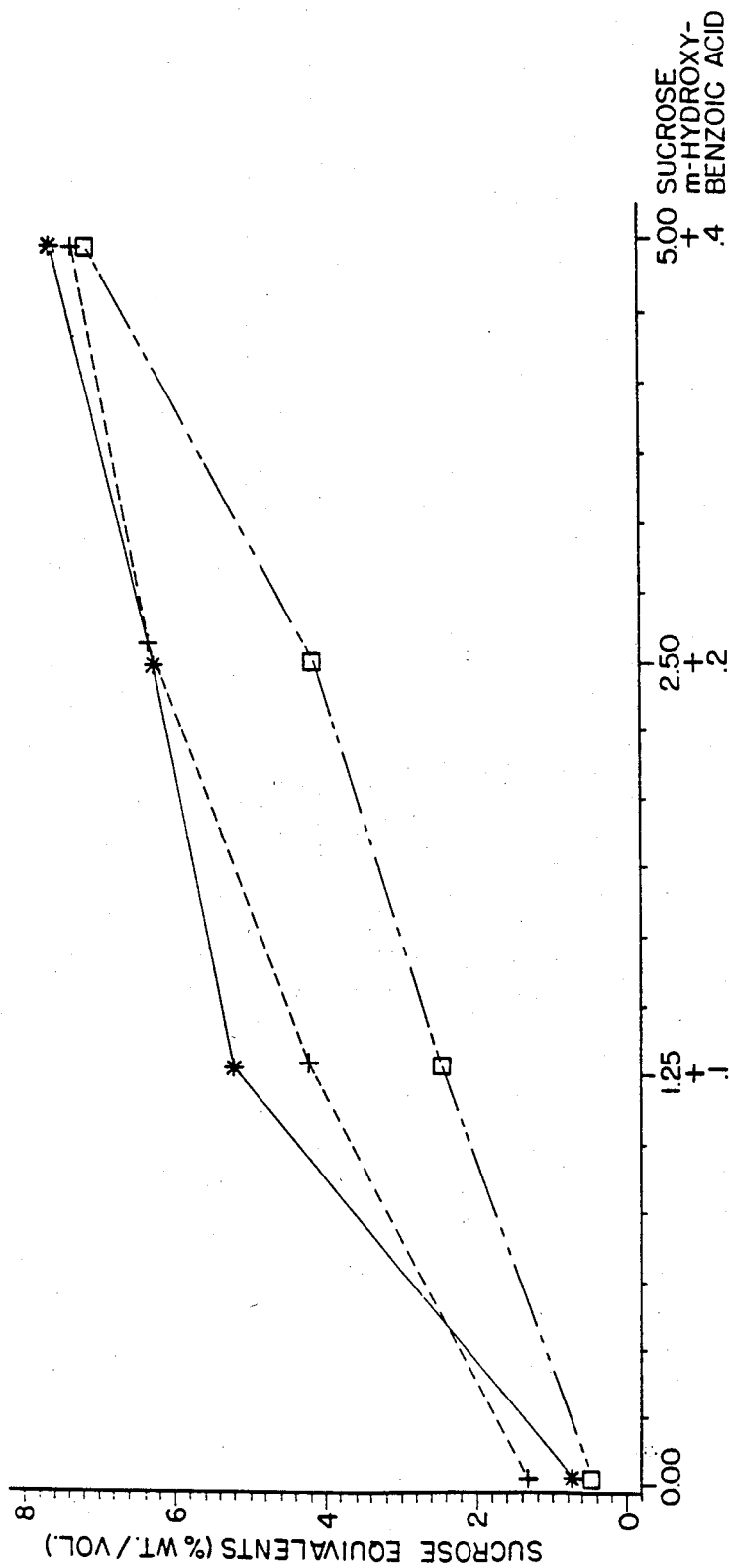
FIG. 3 is a further graphical representation plotting the sweetness of mixtures of m-hydroxybenzoic acid and sucrose, in comparison to sucrose, as a function of concentration at varied pH levels.

Referring to the drawings herein in more detail, FIGS. 1-4 graphically illustrate the results of the present invention. That is, FIG. 1 is a plot of the sweetness of aqueous m-hydroxybenzoic acid solutions in comparison to aqueous sucrose solutions (pH of the sucrose solutions adjusted to the pH of the m-hydroxybenzoic acid solutions) as a function of concentration at various pH levels. FIG. 2 is a similar plot for sucrose, comparing it to itself as a control. FIG. 1 shows that unlike sucrose, m-hydroxybenzoic acid exhibits higher potency in an acidic environment. For example, at pH 3 or 5 and at a concentration of 0.1 wt. %, m-hydroxybenzoic acid provides a sucrose equivalency of more than twice that of which it provides at pH 7 at the same concentration. Furthermore, FIG. 3 illustrates that an aqueous solution, for example, containing a mixture of 0.1 wt. % m-hydroxybenzoic acid and 1.25 wt. % sucrose at pH 7 has the equivalent sweetness of about 2.2 wt. % sucrose, while the same mixture of m-hydroxybenzoic acid and sucrose at pH 3 has a sucrose equivalency of about 5.2 weight percent and at a pH 5 of about 4.2 wt. %. These data clearly show that m-hydroxybenzoic acid has greater sweetness potency in an acidic environment.

Figure 4:
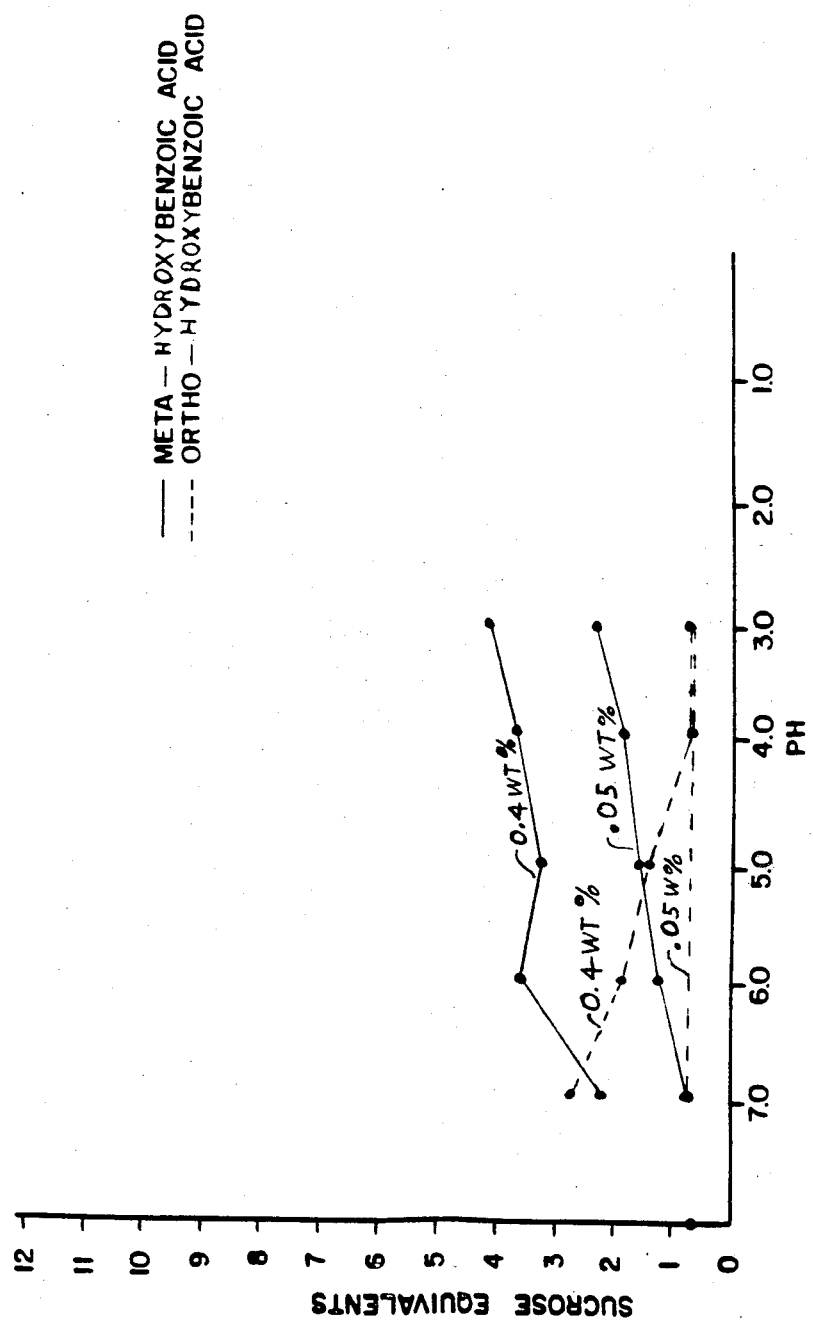
FIG. 4 is a graphical representation plotting the sweetness of m-hydroxybenzoic acid and o-hydroxybenzoic acid, in comparison to sucrose, each at 0.4% by weight and 0.05% by weight concentration at varied pH levels.

The data illustrated by FIG. 4 indicate that the as pH decreases, the perceived sweetness of m-hydroxybenzoic acid, increases which is unexpected. Ordinarily, as the acidity of a food increases (decrease of pH) the perceived sweetness decreases whereas with the present invention the opposite occurs. The degree of perceived sweetness of sour tasting or acidic foods ordinarily is not increased by increasing the acidity. The sweetening agent of the present invention, m-hydroxybenzoic acid and its food acceptable salts was surprisingly and unexpectedly found to function in this way, whereas o-hydroxybenzoic acid did not. In fact, o-hydroxybenzoic acid gave expected results, namely, an increase in acidity lessened the perceived sweetness of this compound.

In addition, the advantageous results of the present invention are further evidenced by a comparison of FIGS. 2 and 3. That is, FIG. 3 shows, for example, that at pH levels of 3 and 5, a mixture, for instance, of 0.1% m-hydroxybenzoic acid and 1.25% sucrose solution is sweeter than a solution containing 2.50% sucrose as the sole sweetener, as illustrated by FIG. 2. Thus, it is readily apparent from these data that the utilization of m-hydroxybenzoic acid in foodstuffs allows for a significant reduction in the amounts of caloric and expensive sweetener, such as sucrose, ordinarily required, yet still achieving the desired level of sweetness in the foodstuff. Similar results are obtained when m-hydroxybenzoic acid is used in combination with another sweetener such as aspartame.

Generally, the data illustrated by FIGS. 1 to 3 were obtained by preparing aqueous solutions either of m-hydroxybenzoic acid, (0.5, 0.10, 0.20 percent), sucrose (1.25, 2.50, 5.00, 10.00 percent), and mixtures of m-hydroxybenzoic acid and sucrose (0.5 and 1.25, 0.10 and 2.50, 0.20 and 5.00 percent, respectively) at pH levels of 3, 5, and 7. The pH of each of the solutions was adjusted and maintained by the addition of conventional acids and/or bases, such as HCl or NaOH, and buffering agents such as citric acid and potassium citrate. The solutions were matched for sweetness to 1 of 14 sucrose solutions ranging in concentration from 0 to 13 percent in 1 percent increments. Each of 18 subjects participated in 3 test sessions, one for each of the pH conditions. Within a session, all test solutions and sucrose standards were at the same pH, either 3, 5 or 7. All testing used a sip and spit procedure and was done double-blind. The data were analyzed by an analysis of variance.

Generally, the data illustrated by FIG. 4 was obtained by preparing aqueous solutions of m-hydroxybenzoic acid (0.05, 0.4 percent) and o-hydroxybenzoic acid (0.05, 0.4 percent) and pH levels of 2.5, 3, 4, 5, 6 and 7. The pH of each of the solutions was adjusted and maintained by the addition of conventional acids and/or bases such as HCl or NaOH, and buffering agents such as citric acid potassium citrate. The solutions were matched for sweetness to 1 of 13 sucrose solution ranging in concentration from 0 to 12 percent in 1 percent increments. Each of 5 subjects participated in 6 test sessions, one for each of the pH conditions. Within a session, all test solutions and sucrose standards were at the same pH. All testing used a sip and spite procedure and was done blind.

The same panel also tested m-hydroxybenzoic acid and o-hydroxybenzoic acid at a concentration of 0.01 weight percent at pH's of 3 and 4 using the above described procedure. It was found that o-hydroxybenzoic acid was not sweet while m-hydroxybenzoic was threshold sweet.

The m-hydroxybenzoic acid of the present invention can be readily prepared according to well known synthetic procedures or can be obtained commercially, (e.g. from Pfaltz and Bauer). For purposes of optimization, it has been found advantageous to utilize about a 99% pure material. A simple procedure for obtaining a material of this purity is, for example, to add the m-hydroxybenzoic acid, with stirring, to boiling distilled water. When no solid material remains visible, granulated charcoal (food approved) is added to the solution and the mixture is stirred further. The resultant mixture is then hot filtered and slowly recrystallized at, for example, about 45°–50° F. The resultant m-hydroxybenzoic acid has a purity of about 99%.

Furthermore, as stated hereinbefore, food acceptable, non-toxic salts of m-hydroxybenzoic acid are also contemplated herein. These salts include carboxylate salts as well as phenolate salts. Carboxylate an/or phenolate salts include, sodium, potassium, calcium, magnesium, ammonium and the like and may be preformed or formed in-situ in the edible material by reaction with typical buffering agents, such as sodium citrate, potassium citrate, sodium acetate, calcium phosphate, such as monocalcium phosphate and tricalcium phosphate, and the like which are also normally employed in edible material to provide the desired pH.

Sweetening compositions comprised of m-hydroxybenzoic acid or its salts which when added to ingesta and/or such sweetening compositions per se wherein both are adjusted to the aforesaid pH are within the scope of the invention and may be preformed, formulated and packaged, for example, so that they can be readily added to edible material to provide the hereinbefore-noted advantages. Moreover, these sweetening compositions may be added to edible material which do not contain sweetener as well as to edible materal containing sweetener.

In order that those skilled in the art may better understand how the present invention may be practiced, the following examples are given by way of illustration.

EXAMPLE 1

As a control, a cherry flavored beverage is prepared by mixing 2.36 gms of a cherry flavor instant beverage base mix with 930 gms of water and 106 gms (10.6 wt. %) sucrose. The base contains citric acid (2.03 gms.). The final aqueous mixture has a pH of about 2.6.

For comparative purposes, a further cherry flavored beverage is prepared by mixing 957 gms of water, 2.36 gms of the same unsweetened base mix as in the control and 63.4 gms sucrose (6.3 wt. %, which is 60% of the sucrose utilized in the control). The formulation has a pH of about 2.6.

For further comparison, another cherry flavored beverage is prepared by mixing 956 gms of water, 2.36 gms of the same unsweetened base mix, 63.4 gms sucrose (6.3 wt. %, 60% of the sucrose in the control) and 1.0 gms (0.1 wt. %) of purified m-hydroxybenzoic acid. This formulation has a pH of about 2.6.

For additional comparison, a further cherry favored beverage is prepared by mixing 956 gms of water, 2.06 gms of the unsweetened base mix, 63.4 gms of sucrose (6.3 wt. % 60% of the sucrose in the control) and 1.0 gms (0.1 wt. %) purified m-hydroxybenzoic acid. In this formulation the citric acid in the unsweetened base is reduced to 1.73 gms (15% reduction) which is advantageously compensated for by the addition of the m-hydroxybenzoic acid. The pH of this formulation is about 2.6.

In evaluating and comparing the sweetness of the afore-described cherry flavored beverage compositions, tasters assessed the sweetness of the beverages containing the 0.1 wt. % m-hydroxybenzoic acid and 60% of the sucrose used in the control to be as sweet as the 100% sucrose control composition as well as having acceptable quality. The same tasters assessed the 60% sucrose containing beverage with no m-hydroxybenzoic acid to be unacceptable.

For further comparision another cherry flavored beverage is prepared by mixing 946 gms of water, 2.36 gms of the same unsweetened base mix, 79 gms sucrose (7.9 wt. %, 75% of sucrose in the control) and 0.5 gms (0.05 wt. %) of purified m-hydroxybenzoic acid. This formulation has a pH of about 2.6.

For additional comparision, a further cherry flavored beverage is prepared by mixing 968 gms of water, 2.36 gms of the same unsweetened base, 42 gms sucrose (4.2 wt. %, 40% of the sucrose in the control) and 2.0 gms (0.2 wt. %) pruified m-hydroxybenzoic acid. The pH of this formulation is about 2.6.

In evaluating and comparing the sweetness of the afore-described cherry flavored beverage compositions, tasters assessed the sweetness of the beverages containing the 0.05 wt. % and 0.2 wt. % m-hydroxybenzoic acid and reduced sucrose to be as sweet as the 100% sucrose control composition as well as having acceptable quality.

EXAMPLE 2

As a control, an orange flavored beverage is prepared by mixing 12.67 gms Tang ™ instant beverage base mix with 913.3 gms of water and 122.6 gms (12.26 wt. %) sucrose. The Tang ™ base contains citric acid (7.1 gms) and potassium citrate (0.7 gms) buffer. The final aqueous mixture has a pH of about 3.0.

For further comparison, another orange flavored beverage is prepared by mixing 950 gms of water, 12.67 gms of the same unsweetened Tang ™ base mix, 61.31 gms sucrose (6.13 wt. %, 50% of the sucrose in the control) and 0.8 gms (0.08 wt. %) of purified m-hydroxybenzoic acid. This formulation has a pH of about 2.9.

For additional comparision, a further orange flavored beverage is prepared by mixng 953.0 gms of water, 11.4 gms unsweetened Tang ™ base, 61.3 gms sucrose (6.13 wt. % 50% of the sucrose in the control) and 0.8 gms (0.08 wt. %) purified m-hydroxybenzoic acid. In this formulation the citric acid in the unsweetened base is reduced to 5.80 gms (18% reduction) which is advantageously compensated for by the addition of the m-hydroxybenzoic acid. The pH of this formulation is about 2.9.

In evaluating and comparing the sweetness of the afore-described orange flavored beverage compositions, tasters assessed the sweetness of the beverages containing the 0.08 wt. % m-hydroxybenzoic acid and 50% of the sucrose used in the control to be as sweet as the 100% sucrose control composition as well as having acceptable quality.

EXAMPLE 3

As a control, a mixed fruit gelatin is prepared by mixing 474.0 gms of an unsweetened gelatin base mix with 47.40 gms of water and 0.3737 gms (0.077 wt. %) APM. The gelatin base contains an adipic acid and disodium phosphate buffer. The final gelatin has a pH of about 3.9.

For comparative purposes, a further mixed fruit gelatin is prepared by mixing 474.0 gms of water, 10.31 gms of the same unsweetened gelatin base mix as in the control, 0.1868 gms APM (0.038 wt. %, which is 50% of the APM used in the control) and 0.387 gms (0.08 wt. %) purified m-hydroxybenzoic acid. The final gelatin has a pH of about 3.8.

In evaluating and comparing the sweetness of the afore-described gelatin compositions, tasters assessed the sweetness of the gelatins containing the m-hydroxybenzoic acid and reduced APM to be as sweet as the 100% APM control composition as well as having acceptable quality.

EXAMPLE 4

As a control, an angel food cake is prepared by baking an angel food cake batter containing 37 wt. % sucrose (pH about 5.4).

For comparative purposes, an angel food cake is prepared by baking the same angel food cake batter containing 27.0 wt. % sucrose (which 60% of the sucrose used in the control) and 0.1 wt. % m-hydroxybenzoic acid (pH about 5.24).

In evaluating and comparing the sweetness of the afore-described angel food cakes, tasters assessed the sweetness of the cake containing the m-hydroxybenzoic acid and reduced sucrose to be as sweet as the 100% sucrose control cake as well as having acceptable quality.

EXAMPLE 5

As a control, ready-to-drink cola containing about 0.035 wt. % saccharin is prepared by mixing 0.097 gms saccharin, 47.365 gms water, 1.27 gms cola concentrate and 226.27 gms salt free club soda. The final cola has a pH of about 2.6.

For comparative purposes, a further ready-to-drink cola beverage is prepared by admixing 47.365 gms water, 0.0388 gms saccharin (0.0141 wt. % saccharin, 40% of the control), 1.27 gms cola concentrate, 0.10 wt. % m-hydroxybenzoic acid and 226.27 gms salt free club soda. This cola has a pH of about 2.6.

In evaluating and comparing the sweetness of the afore-described cola beverages, tasters assessed the sweetness of the beverage containing the m-hydroxybenzoic acid and reduced saccharin to be as sweet as the 100% saccharin control as well as having acceptable quality.

EXAMPLE 6

As a control, a punch flavored beverage is prepared by mixing 4.97 gms undiluted punch beverage base mix with 993.1 gms of water and 0.38 gms (0.038 wt. %) APM. The punch mix contains a citric acid, potassium citrate, and tricalcium phosphate buffer. The final aqueous mixture has a pH of about 3.3.

For comparative purposes, a further punch flavored beverage is prepared by mixing 992.7 gms of water, 4.97 gms of the same unsweetened base mix as in the control and 0.19 gms APM (0.019) wt. %, which is 50% of the APM utilized in the control). The formulation has a pH of about 3.3.

For further comparison, another punch flavored beverage is prepared by mixing 992.7 gms of water, 4.97 gms of the same unsweetened base mix, 0.19 gms APM (0.019 wt. %, 50% of the APM in the control) and 0.8 gms (0.08 wt. %) of purified m-hydroxybenzoic acid. This formulating has a pH of about 3.29.

EXAMPLE 7

As a control, a mixed cherry gelatin is prepared by mixing 9.194 gms of an unsweetened gelatin base mix with 474.0 gms of water and 0.14 gms (0.029 wt. %) saccharin. The gelatin base contains an adipic fumaric acid and potassium citrate buffer. The final gelatin has a pH of about 3.89.

For further comparison, another mixed cherry gelatin is prepared by mixing 474.0 gms of water, 9.194 of the same unsweetened gelatin base mix, 0.07 gms saccharin (0.0145 wt. %, 50% of the saccharin in the control) and 0.24 gm (0.08 wt. %) of purified m-hydroxybenzoic acid. This formulation has a pH of about 3.85.

In evaluating and comparing the sweetness of the afore-described gelatin compositions, tasters assessed the sweetness of the gelatins containing the m-hydroxybenzoic acid and reduced saccharin to be as sweet as the 100% saccharin control composition as well as having acceptable quality.

Obviously, other modifications and variations of the present invention are possible in the light of the above teachings. It is, therefore, to be understood theat changes may be made in the particular embodiments of this invention which are within the full intended scope of the invention as described in the specification and drawings and defined by the appended claims.

What is claimed is:

1. An edible composition comprising
   an edible material,
   a food-acceptable sweetener for sweetening said edible material, other than m-hydroxybenzoic acid or a food-acceptable, non-toxic salt thereof, said sweetener being present in an amount sufficient to sweeten said edible composition and above 1 wt. % sucrose equivalents, and
   a sweetness-modifying agent selected from m-hydroxygenzoic acid, food-acceptable, non-toxic salts thereof, and mixtures thereof wherein the sweetness modifying agent is present in an amount from 0.01 to 0.4% by weight based on the consumed weight of said edible material, said edible composition having a pH of from 2 to 5.5.

2. The composition of claim 1 wherein said sweetness modifying agent comprises m-hydroxybenzoic acid.

3. The composition of claim 1 wherein said sweetness modifying agent comprises the calcium salt of m-hydroxybenzoic acid.

4. The composition of claim 1 wherein said food-acceptable sweetener is selected from sucrose, fructose, corn syrup solids, dextrose, xylitol, sorbitol, mannitol, acetosulfam, thaumatin, invert sugar, L sugras, saccharin, cyclamate, chlorosucrose, dihydrochalcone, meta-aminobenzoic acid, aspartame and other dipeptides, stevioside, glycyrrhizin or mixtures thereof.

5. The composition of claim 1 wherein said sweetener is present in said composition in amounts of up to 25 wt. % sucrose equivalents.

6. The composition of claim 1 wherein said sweetness modifying agent is present in an amount of from about 0.5 to about 0.2% by weight based on the consumed weight of said edible material.

7. A process.for modifying the sweetness perception of edible material, said process comprising combining edible material, a food-acceptable sweetener for said edible material, other than m-hydroxybenzoic acid or a food-acceptable, non-toxic salt thereof, and a sweetness modifying agent selected from m-hydroxybenzoic acid, food-acceptable, non-toxic salts thereof, and mixtures thereof, to form a composition, said food-acceptable sweetener being present in an amount above 1 wt. % sucrose equivalents, said sweetness modifying agent being present in an amount from 0.01 to 0.4% by weight based on the consumed weight of said edible material, said composition having a pH of from 2 to 5.5.

8. The process of claim 7 wherein said sweetness modifying agent comprises m-hydroxybenzoic acid.

9. The process of claim 7 wherein said sweetness modifying agent comprises the calcium salt of m-hydroxybenzoic acid.

10. The process of claim 7 wherein said sweetener is present in said edible material in amounts of up to 25 wt.% of sucrose equivalents.

11. The process of claim 7 wherein said food-acceptable sweetener is present in an amount from about 3 wt. % to about 15 wt. % sucrose equivalents.

12. The process of claim 7 wherein said food-acceptable sweetener is selected from sucrose, fructose, corn syrup solids, dextrose, xylitol, sorbitol, mannitol, acetosulfam, thaumatin, invert sugar, L sugars, saccharin, cyclamate, chlorosucrose, dihydrochalcone, m-aminobenzoic acid, aspartame and other dipeptides, stevioside, glycyrrhiz-n or mixtures thereof.

13. A pre-mix composition capable, on dilution, of providing an edible composition having a pH of from 2 to 5.5, said pre-mix edible composition comprising:
    an edible material;
    a food-acceptable sweetener for said edible material, other than m-hydroxybenzoic acid, or a food-acceptable, non-toxic salt thereof, in an amount sufficient to sweeten said edible composition ad above 1 wt. % sucrose equivalents; and
    a sweetness modifying agent selected from m-hydrobenzoic acid, food-acceptable, non-toxic salts thereof, and mixtures thereof, said sweetness modifying agent being present in said pre-mix edible composition in an amount sufficient such that when said pre-mix edible composition is diluted to provide said edible composition, said sweetness modifying agent is present in said edible composition in an amount of from 0.01 to 0.4% by weight.

14. A pre-mix edible composition according to claim 13 wherein said sweetness modifying agent comprises m-hydrobenzoic acid.

15. A pre-mix edible composition according to claim 13 wherein said sweetness modifying agent comprises the calcium salt of m-hydroxybenzoic acid.

16. A pre-mix composition according to claim 13 wherein said food-acceptable sweetener is selected from sucrose, fructose, corn syrup solid, dextrose, xylitol, sorbitol, mannitol, acetosulfam, thaumatin, invert sugar, L sugars, saccharin, cyclamate, chlorosucrose, dihydrochalcone, m-aminobenzoic acid, aspartame and other dipeptides, stevioside, glycyrrhizin or mixtures thereof.

* * * * *